United States Patent Office 3,577,379
Patented May 4, 1971

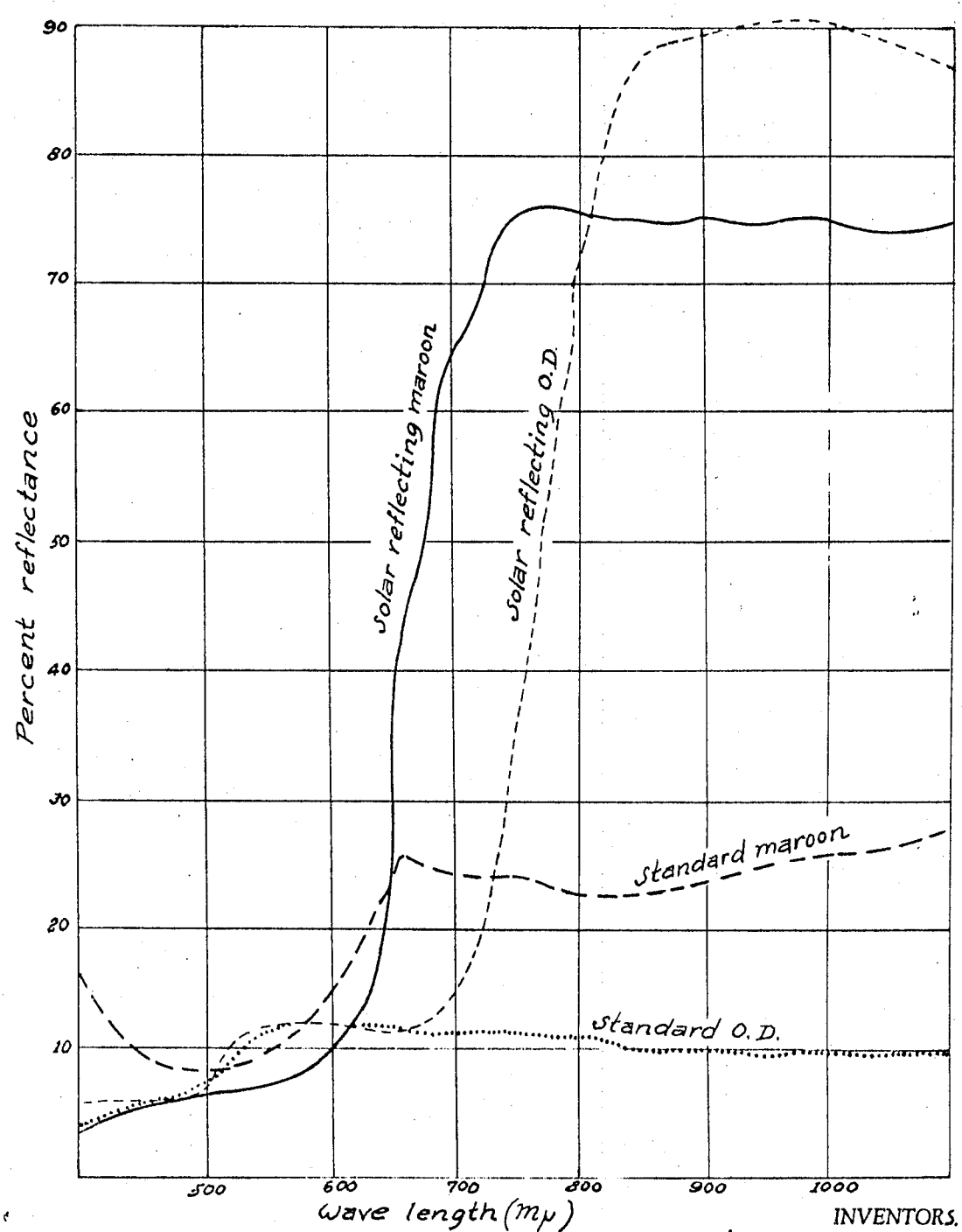

3,577,379
DARK COLORED COATINGS OF HIGH SOLAR HEAT REFLECTANCE
Melvin H. Sandler, Baltimore, and Merrill Cohen, Havre de Grace, Md., assignors to the United States of America as represented by the Secretary of the Army
Continuation-in-part of abandoned application Ser. No. 567,162, July 22, 1966. This application Mar. 11, 1969, Ser. No. 834,571
Int. Cl. C08g 51/04
U.S. Cl. 260—40
5 Claims

ABSTRACT OF THE DISCLOSURE

A dark colored coating of high solar heat reflectance utilized to minimize heat build-up in the interior of objects exposed to sunlight comprising a mixture of pigments having a high-infrared reflectance such as quinacridone red, the violet to red shade of carbazole dioxazine, and titanium dioxide in combination with pigments such as lead chromate, molybdate orange, and phthalocyanine blue in order to obtain an acceptable color match. The pigment mixture is dispersed with extender pigments and suitable vehicles together with driers, volatile solvents, antioxidants, wetting agents, stabilizers and other additives of the art to form an enamel.

---

This is a continuation-in-part of application 567,162 filed July 22, 1966, now abandoned.

The invention described herein may be manufactured, used, and licensed by or for the Government for governmental purposes without the payment to us of any royalty thereon.

This invention relates to dark colored coatings of high solar heat reflectance. More particularly, the invention relates to improved olive drab and other dark colored coatings for minimizing heat build-up in the interior of objects exposed to the sun's rays.

Previous coatings of high solar heat reflectance were light colors, such as white, aluminum or pale green and contained pigments such as titanium dioxide, aluminum metal or chromium oxide. These colors, however, do not provide the low visibility characteristics that are so essential for disguising missiles, military vehicles, weapon systems and the like. The use of antimony sulfide for preparing darker colors resulted in coatings with very poor color permanence.

It is therefore an object of this invention to provide dark colored coatings which may be exposed to solar radiation to experience considerably lower temperatures than is possible with previous coatings of the same coloration.

Another object of the invention is to provide improved coatings for missiles, vehicles, military weapons, etc. which will minimize heat buildup in these objects and thus lengthen their useful life and/or operational reliability.

A further object is to provide finish coatings which in addition to their high solar heat reflectance also display good color permanence and low visibility characteristics.

These and other objects will be apparent to one skilled in the art in the light of the instant specification.

The present invention is based on the finding that various mixtures of color pigments are possible to produce an olive drab and other dark colored coatings with a high solar heat reflectance. Dark coatings are as a rule heat absorbent. However, the present coatings contain a mixture of pigments that produce dark or low visibility colors and which are also highly reflective within the energy curve for sunlight. The desired reflectance falls within the spectral region of 0.2 to 2.5 microns with particular emphasis in the infrared regions.

In accordance with this invention, a proper combination of pigments will produce the desired color as well as provide a high percentage of solar heat reflectance. Thus, pigments which are combined for this purpose include one or more pigments of high infrared reflectance with other pigments which may be heat absorptive, but which are nevertheless suitable to produce the desired color. The overall effect of the pigments is an effective solar heat reflectance without disrupting or distracting from other performance characteristics. High infrared reflectance is achieved by pigments such as quinacridone red, the violet to red shade of carbazole dioxazine, titanium dioxide and others. The quinacridone red utilized in the present invention, which is represented by the structural formula:

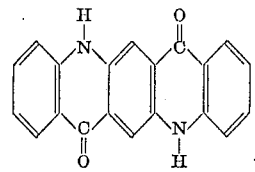

is set forth in the pigment list of the sales literature of E. I. du Pont de Nemours & Co. under the trade name of Monastral Red. The carbazole dioxazine utilized in the present invention, which is represented by the structure formula:

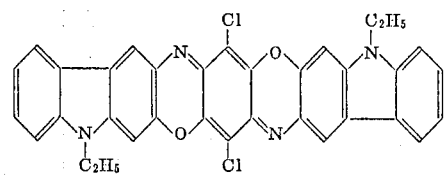

is set forth in the pigment list of the sales literature of American Cyanamid under the trade name Cyanadur Violet. These and other pigments produce dark coatings without employing any antimony or other black pigments.

Olive drab is the conventional low visibility color used by the military for paints, enamels, lacquers, etc. for various coating purposes. The olive drab color will therefore be employed in describing certain preferred embodiments thereof although many other colors are of course possible in the light of the present teaching.

Olive drab color may now be produced by including the high infrared pigments mentioned previously with certain other pigments, such as lead chromate, molybdate orange and phthalocyanine blue to obtain an acceptable color match. The pigment mixture is dispersed with extender pigments and suitable vehicles to form an enamel together with driers, volatile solvents, antioxidants, wetting agents, stabilizers and other additives of the art.

Various type coating vehicles may be used to formulate enamel finishes, for example, alkyd resins, nitrocellulose, acrylic, chlorinated paraffin and others. Suitable extender pigments are the siliceous matter or mixtures of siliceous matter and barytes.

Illustrative of the practice of the present invention are the following examples of olive drab and maroon formulations prepared as lusterless enamels:

EXAMPLE I (OLIVE DRAB)

| Pigment: | Parts by weight |
|---|---|
| Lead chromate | 56.4 |
| Quinacridone red | 6.5 |
| Molybdate orange | 25.2 |
| Phthalocyanine blue | 4.4 |
| Titanium dioxide | 7.4 |
| Extender—Magnesium silicate | 122.2 |
| Vehicle—Styrenated alkyl resin [1] | 130 |
| Solvent—Xylene | 325 |
| Stabilizer—Diethylamine | 0.3 |
| Drier—Cobalt naphthenate | 0.6 |
| Antioxidant | 0.6 |

[1] The styrenated alkyl resin used in this formulation is a copolymer of styrene and phthalic alkyd resins modified with drying vegetable oil.

The use of a small amount of suspension agent will improve the suspension properties. Enamels of this type show some tendency to be thixotropic at higher viscosities. The use of a material such as diethylamine to the extent of 0.5 to 1.0 percent on the resin solids basis has been found to reduce this condition materially and improve the package stability.

The pigments, extender, diethylamine and a portion of the vehicle may be dispersed for 18–24 hours in a porcelain ball mill using 2:1 ratio of porcelain balls by weight and then the milled product is reduced in the remaining resin, xylene, dried and antioxidant.

The solar heat reflecting characteristic for the olive drab formulation of Example 1 was determined and compared with the reflecting characteristics of a standard olive drab enamel according to Federal Specification TT-E-516. The reflectance curves for these two olive drab coatings are shown in the accompanying drawing. The two curves labeled STANDARD O.D. and SOLAR REFLECTING O.D. were obtained by plotting the percent reflectance using MgO standard against the spectral region 400–1100 m$\mu$. Infrared reflectance may be determined in accordance with the method 6242 of Federal Test Method Standard 141 using a Beckman DU with reflectance attachment.

It is readily apparent from a comparison of the two curves that the present coating formulated in accordance with the teachings of this invention shows remarkable reflectance over the prior art coating of identical color.

EXAMPLE II (OLIVE DRAB)

| Pigments: | Parts by weight |
|---|---|
| Lead chromate | 92 |
| Violet carbazole dioxazine | 2.7 |
| Phthalocyanine blue | 1.7 |
| Titanium dioxide | 3.6 |

| Other constituents: | |
|---|---|
| Magnesium silicate | 122.2 |
| Styrenated alkyd resin | 129 |
| Xylene | 324 |
| Diethylamine | 0.3 |
| Cobalt drier (6%) | 0.6 |
| Antioxidant | 0.6 |

EXAMPLE III (OLIVE DRAB)

| Pigments: | Parts by weight |
|---|---|
| Lead chromate | 89 |
| Red lead (97%) | 68 |
| Zinc oxide | 21.6 |
| Quinacridone red | 22.4 |
| Phthalocyanine blue | 7.9 |

| Other constituents: | |
|---|---|
| Magnesium silicate | 85.2 |
| Alkyd resin (Fed Spec TT-R-266 Type III) | 162.0 |
| Mineral spirits | 258 |
| Cobalt drier (6%) | 1.6 |
| Manganese drier (5%) | 0.8 |

EXAMPLE IV (MAROON)

| Pigments: | Parts by weight |
|---|---|
| Molybdate orange | 56.4 |
| Lead chromate | 25.9 |
| Violet, carbazole dioxazine | 3.6 |
| Titanium dioxide | 14.1 |

| Other constituents: | |
|---|---|
| Magnesium silicate | 122.2 |
| Styrenated alkyd resin [1] | 244.7 |
| Xylene | 194.1 |
| Diethylamine | 0.3 |
| Cobalt naphthenate | 0.6 |
| Antioxidant | 0.6 |

[1] Styrenated alkyd resin composition as specified for Example I.

The reflectance curves of the present solar heat reflecting maroon (CCL 613–411) as disclosed above and of a standard maroon coating (CCL 355–511) were determined and are shown in the drawing under the labels SOLAR REFLECTING MAROON AND STANDARD MAROON. (These reflectance curves were determined as in Example I.) The improved results that were obtained using the present pigmentation for a maroon coating is again manifest. Under simulated solar heating the present maroon coating has shown approximately 30 degrees lower temperature over the standard maroon color.

The present coating may be utilized in conjunction with a highly reflective undercoat to preferentially reflect the near infrared energy in sunlight within the spectral region of 0.7 to 2.5 microns while simultaneously maintaining low reflectance in the visible region. The highly reflectance undercoat may be polished aluminum or multiple coats of a white paint or substrate highly reflective to near infrared radiation.

Although we have described our invention with a certain degree of particularity, it is understood that the present description has been made in order to set forth the best mode contemplated by the inventors in carrying out their invention and is not intended as a limitation thereof, as modifications may be made in the components and proportions of this invention without departing from the spirit and scope thereof.

Having described our invention, we claim:

1. A dark colored enamel coating of high solar heat reflectance which includes a mixture of pigments selected from the group consisting of:
   (a) about 56.4 parts of lead chromate, about 6.5 parts of quinacridone red, about 25.2 parts of molybdate orange, about 4.4 parts of phthalocyanine blue and about 7.4 parts of titanium dioxide,
   (b) about 92 parts of lead chromate, about 2.7 parts of violet carbazole dioxazine, about 1.7 parts of phthalocyanine blue and about 3.6 parts of titanium dioxide,
   (c) about 89 parts of lead chromate, about 68 parts of red lead, about 21.6 parts of zinc oxide, about 22.4 parts of quinacridone red and about 7.9 parts of phthalocyanine red, and
   (d) about 56.4 parts of molybdate orange, about 25.9 parts of lead chromate, about 3.6 parts of violet carbazole dioxazine and about 14.1 parts of titanium dioxide,
   all of said part being on a weight basis.

2. An enamel coating according to claim 1 wherein the mixture of pigments is; about 56.4 parts of lead chromate, about 6.5 parts of quinacridone red, about 25.2 parts of molybdate orange, about 4.4 parts of phthalocyanine blue and about 7.4 parts of titanium dioxide.

3. An enamel coating according to claim 1 wherein the mixture of pigments is; about 92 parts of lead chromate, about 2.7 parts of violet carbazole dioxazine, about 1.7 parts of phthalocyanine blue and about 3.6 parts of titanium dioxide.

4. An enamel coating according to claim 1 wherein the mixture of pigments is; about 89 parts of lead chromate, about 68 parts of red lead, about 21.6 parts of zinc oxide, about 22.4 parts of quinacridone red and about 7.9 parts of phthalocyanine blue.

5. An enamel coating according to claim 1 wherein the mixture of pigments is; 56.4 parts of molybdate orange, about 25.9 parts of lead chromate, about 3.6 parts of violet carbazole dioxazine and about 14.1 parts of titanium dioxide.

References Cited

UNITED STATES PATENTS 2,844,484  7/1958  Reidinger et al. _____ 106—288

OTHER REFERENCES

Nagai: Chemical Abstracts, vol. 60, col. 4307, "Dyeing of Organic Materials."

MORRIS LIEBMAN, Primary Examiner

L. T. JACOBS, Assistant Examiner

U.S. Cl. X.R.

106—288